(12) United States Patent
Kwon (10) Patent No.: US 12,367,297 B2
(45) Date of Patent: Jul. 22, 2025

(54) BATTERY DATA MANAGEMENT SYSTEM AND OPERATING METHOD THEREOF

(71) Applicant: LG Energy Solution, Ltd., Seoul (KR)

(72) Inventor: Jung Hyun Kwon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/254,561

(22) PCT Filed: Jul. 27, 2022

(86) PCT No.: PCT/KR2022/011064
§ 371 (c)(1),
(2) Date: May 25, 2023

(87) PCT Pub. No.: WO2023/018071
PCT Pub. Date: Feb. 16, 2023

(65) Prior Publication Data
US 2024/0012914 A1   Jan. 11, 2024

(30) Foreign Application Priority Data

Aug. 13, 2021 (KR) .......................... 10-2021-0107251

(51) Int. Cl.
G06F 21/60    (2013.01)
(52) U.S. Cl.
CPC ................................. *G06F 21/602* (2013.01)
(58) Field of Classification Search
None
See application file for complete search history.

(56) References Cited

U.S. PATENT DOCUMENTS

2009/0292918 A1   11/2009   Mori et al.
2011/0066309 A1   3/2011    Matsuoka et al.
(Continued)

FOREIGN PATENT DOCUMENTS

CN   105723648 B   6/2019
CN   109462572 B   3/2021
(Continued)

OTHER PUBLICATIONS

G. Kumar et al., "A Privacy-Preserving Secure Framework for Electric Vehicles in IoT Using Matching Market and Signcryption," in IEEE Transactions on Vehicular Technology, vol. 69, No. 7, pp. 7707-7722, Jul. 2020 (Year: 2020).*

(Continued)

*Primary Examiner* — Paul R Fisher
(74) *Attorney, Agent, or Firm* — Lerner David LLP (57) ABSTRACT

An battery data management method according to an embodiment disclosed herein includes transmitting, by a terminal, battery-related information of a battery to an authentication server to obtain a public key and a first message, encrypting by the terminal, a first message with the public key, and transmitting, by the terminal, the encrypted first message to a processor, decrypting, by the processor, the encrypted first message using a previously stored first key to obtain the first message, generating, by the processor, a second message based on random number information, encrypting, by the processor, the second message with the first key, and transmitting, by the processor, the encrypted second message to the terminal, decrypting, by the terminal, the second message with the public key to obtain the second message and transmitting, by the terminal, the first message and the second message to the authentication server.

16 Claims, 8 Drawing Sheets

(56) References Cited

U.S. PATENT DOCUMENTS

| | | |
|---|---|---|
| 2011/0099144 A1 | 4/2011 | Levy et al. |
| 2011/0270480 A1 | 11/2011 | Ishibashi et al. |
| 2014/0281554 A1* | 9/2014 | Maletsky ............... H04L 9/3268 713/175 |
| 2015/0123619 A1 | 5/2015 | Marathe et al. |
| 2016/0269176 A1 | 9/2016 | Pang et al. |
| 2017/0134164 A1 | 5/2017 | Haga et al. |
| 2019/0283621 A1 | 9/2019 | Lin et al. |
| 2019/0364036 A1* | 11/2019 | Simpson ................. H04W 4/60 |
| 2020/0036194 A1 | 1/2020 | Park et al. |
| 2020/0156497 A1 | 5/2020 | Lee et al. |
| 2020/0220716 A1 | 7/2020 | Haga et al. |
| 2022/0340039 A1 | 10/2022 | Unagami et al. |
| 2023/0289424 A1* | 9/2023 | Wang .................... G06F 21/602 |

FOREIGN PATENT DOCUMENTS

| | | | |
|---|---|---|---|
| CN | 109788482 B | 9/2021 | |
| EP | 1662697 A1 * | 5/2006 | ............ H04L 9/32 |
| EP | 1178644 B1 | 7/2006 | |
| EP | 1965539 A1 | 9/2008 | |
| EP | 2295282 A2 | 3/2011 | |
| EP | 3219553 A1 * | 10/2015 | ............ B60R 16/02 |
| IN | 111740989 B | 5/2021 | |
| JP | 2007195155 A | 8/2007 | |
| JP | 4319691 B2 | 8/2009 | |
| JP | 2010045668 A | 2/2010 | |
| JP | 5064003 B2 | 10/2012 | |
| JP | 2015187940 A | 10/2015 | |
| JP | 6037450 B2 | 12/2016 | |
| JP | 2019180226 A | 10/2019 | |
| KR | 100559542 B1 | 3/2006 | |
| KR | 100957044 B1 | 5/2010 | |
| KR | 101541165 B1 | 8/2015 | |
| KR | 20160073087 A | 6/2016 | |
| KR | 101641434 B1 | 7/2016 | |
| KR | 20190133972 A | 12/2019 | |
| KR | 20200057518 A | 5/2020 | |
| KR | 102203247 B1 | 1/2021 | |
| KR | 102252179 B1 | 5/2021 | |
| KR | 102310811 B1 | 10/2021 | |
| WO | 2021035298 A1 | 3/2021 | |
| WO | 2021145360 A1 | 7/2021 | |

OTHER PUBLICATIONS

Search report from International Application No. PCT/KR2022/011064, mailed Nov. 2, 2022.

Extended European Search Report including Written Opinion for Application No. 22856070.2 dated May 2, 2024, pp. 1-9.

* cited by examiner

BATTERY DATA MANAGEMENT SYSTEM AND OPERATING METHOD THEREOF

CROSS-REFERENCE TO RELATED APPLICATION

The present application is a national phase entry under 35 U.S.C. § 371 of International Application No. PCT/KR2022/011064 filed Jul. 27, 2022 which claims priority to Korean Patent Application No. 10-2021-0107251 filed on Aug. 13, 2021 in the Republic of Korea, the disclosures of which are incorporated herein by reference.

TECHNICAL FIELD

Embodiments disclosed herein relate to a battery data management system and an operating method thereof.

BACKGROUND ART

An electric vehicle is supplied with electricity from outside to charge a battery, and then a motor is driven by a voltage charged in the battery to obtain power. The battery of the electric vehicle may have heat generated therein by chemical reaction occurring in a process of charging and discharging electricity, and the heat may impair performance and lifetime of the battery. Thus, a battery management apparatus (or a battery management system (BMS)) may manage a battery by monitoring battery data including a temperature, a voltage, and a current of the battery.

However, typical battery data may be obtained by physically separating a battery pack from a vehicle. Thus, to obtain the battery data, there is the inconvenience of having to remove/attach the battery pack from/to the vehicle. Moreover, there is no device capable of guaranteeing security for sensitive data requiring confidentiality assurance in a process of obtaining the battery data, such that a forged external intrusion message on the network may be allowed, posing a fatal threat to the vehicle and a driver.

SUMMARY

Technical Problem

Embodiments disclosed herein aim to provide a battery data management system and an operating method thereof in which data of a battery may be directly obtained through a wired/wireless network and a security-enhanced battery data communication environment may be created.

Technical problems of the embodiments disclosed herein are not limited to the above-described technical problems, and other unmentioned technical problems would be clearly understood by one of ordinary skill in the art from the following description.

Technical Solution

A battery data management method according to an embodiment disclosed herein includes transmitting, by a terminal, battery-related information to an authentication server to obtain a public key and a first message, encrypting, by the terminal, a first message with the public key, and transmitting, by the terminal, the encrypted first message to a processor, decrypting, by the processor, the encrypted first message using a previously stored first key to obtain the first message, generating, by the processor, a second message based on random number information, encrypting, by the processor, the second message with the first key, transmitting, by the processor, the encrypted second message to the terminal, decrypting, by the terminal, the second message with the public key to obtain the second message and transmitting the first message and the second message to the authentication server, generating, by an authentication server, a third message based on the random number and transmitting, by the authentication server, the third message to the terminal, encrypting, by the terminal, the third message with the public key transmitting, by the terminal, the encrypted third message to the processor, decrypting, by the processor, the encrypted third message using the first key to obtain the third message, generating, by the processor, a second key that is a shared session key, encrypting, by the processor, the second key with the first key, and transmitting, by the processor, the encrypted second key to the terminal.

According to an embodiment, the battery data management method may further include decrypting, by the terminal, the encrypted second key using the public key to obtain the second key.

According to an embodiment, the battery data management method may further include encrypting, by the processor, battery related information with the second key and transmitting, by the processor, the encrypted battery data to the terminal.

According to an embodiment, the battery data management method may further generating, by the processor, a message corresponding to the first message and verifying stability of the terminal by determining whether the first message and the message corresponding to the first message are the same as each other.

According to an embodiment, generating the second message based on the random number information is performed using OTP information.

According to an embodiment, the battery data management method further include inferring serial number information of the battery based on the first message and determining whether the inferred serial number information of the battery is suitable.

According to an embodiment, the battery data management method further include generating a message corresponding to the second message based on the random number information and determining whether the second message and the message corresponding to the second message are the same as each other.

According to an embodiment, generating, by the authentication server, the third message based on the random number information is performed using the OTP information.

According to an embodiment, the battery data management method further include generating a message corresponding to the third message based on the random number information and verifying the third message by determining whether the third message and the message corresponding to the third message are the same as each other.

According to an embodiment, the battery data management method further include obtaining, by the terminal, the battery-related information by scanning the battery.

According to an embodiment, the battery-related information may include information of a vehicle having the battery mounted thereon.

A battery data management system according to an embodiment disclosed herein includes a terminal configured to obtain a public key and a first message based on battery-related information, encrypt the first message with the public key, and request transmission of battery data based on the encrypted first message, a processor configured to decrypt the encrypted first message using a previously stored first key to obtain the first message, generate a second message based on random number information, encrypt the second message with the first key, and transmit the encrypted second message to the terminal to verify stability of the terminal, and an authentication server configured to generate a third message based on the random number information and transmit the third message to the terminal to verify stability of the processor.

According to an embodiment, the terminal may be further configured to receive the encrypted second message from the processor, decrypt the second message with the public key to obtain the second message, and transmit the first message and the second message to the authentication server.

According to an embodiment, the terminal may be further configured to receive the third message from the authentication server, encrypt the third message with the public key, and transmit the encrypted third message to the processor.

According to an embodiment, the processor may be further configured to decrypt the encrypted third message using the first key to obtain the third message, generate a second key that is a shared session key, encrypt the second key with the first key, and transmit the encrypted second key to the terminal.

According to an embodiment, the terminal may be further configured to decrypt the encrypted second key using the public key to obtain the second key, wherein the terminal and the processor may be further configured to encrypt and decrypt the battery data with the second key to perform data communication.

Advantageous Effects

A battery data management system and an operating method thereof according to an embodiment disclosed herein may directly obtain data of a battery through a wired/wireless network and create a security-enhanced battery data communication environment.

DETAILED DESCRIPTION

Hereinafter, some embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These terms are used merely for distinguishing one component from another component and do not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present document.

Figure 1:
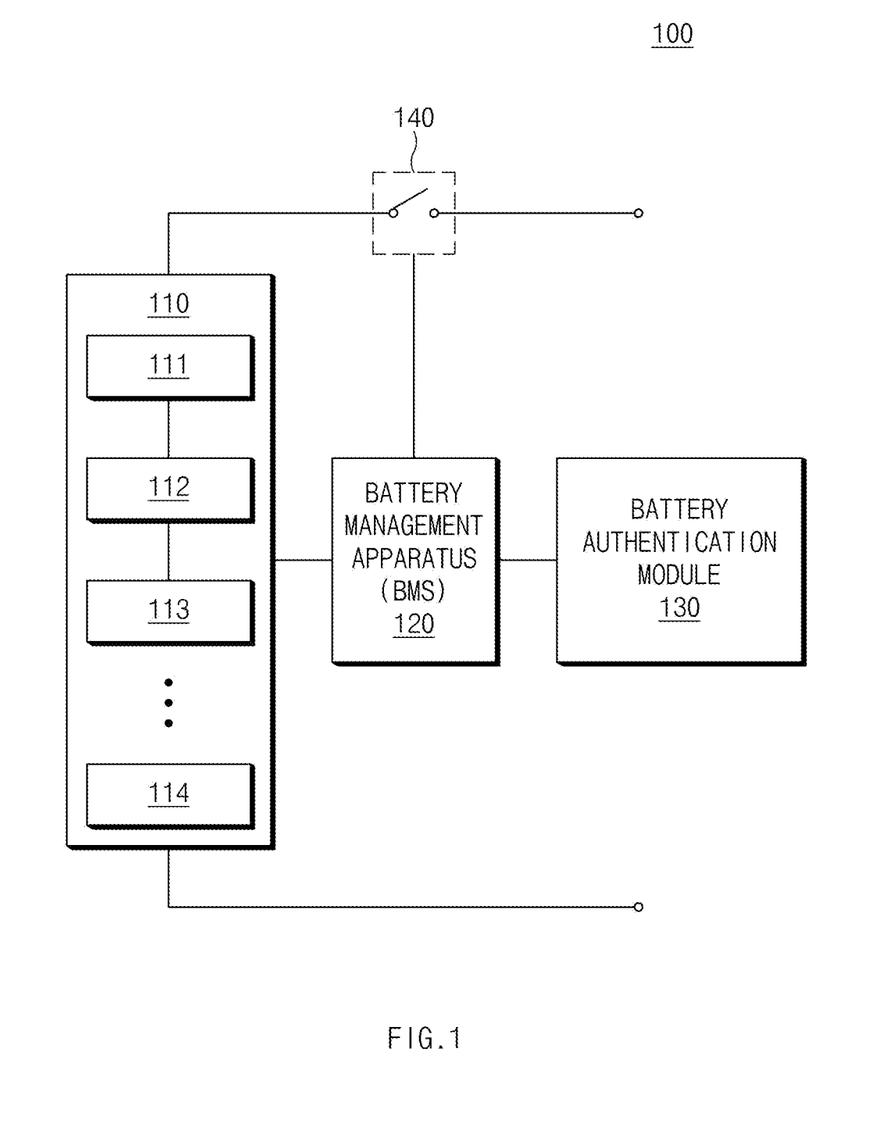
FIG. 1 illustrates a configuration of a battery pack according to an embodiment disclosed herein.

FIG. 1 illustrates a battery pack according to an embodiment disclosed herein.

Referring to FIG. 1, a battery pack 100 according to an embodiment disclosed herein may include a battery module 110, a battery management apparatus 120, a battery authentication module 130, and a relay 140.

The battery module 110 may include a first battery cell 111, a second battery cell 112, a third battery cell 113, and a fourth battery cell 114. Although the plurality of battery cells are illustrated as four in FIG. 1, the present invention is not limited thereto, and the battery module 110 may include n battery cells (n is a natural number equal to or greater than 2).

The battery module 110 may supply power to a target device (not shown). To this end, the battery module 110 may be electrically connected to the target device. Herein, the target device may include an electrical, electronic, or mechanical device that operates by receiving power from the battery pack 100 including the plurality of battery cells 111, 112, 113, and 114, and the target device may be, for example, an electric vehicle (EV), but is not limited thereto.

The battery cell 111 may be a lithium ion (Li-ion) battery, an Li-ion polymer battery, a nickel-cadmium (Ni—Cd) battery, a nickel hydrogen (Ni-MH) battery, etc., and may not be limited thereto. Meanwhile, although one battery module 110 is illustrated in FIG. 1, the battery module 110 may be configured in plural according to an embodiment.

The battery management apparatus (or a battery management system (BMS)) 120 may manage and/or control a state and/or an operation of the battery module 110. For example, the battery management apparatus 120 may manage and/or control the states and/or operations of the plurality of battery cells 111, 112, 113, and 114 included in the battery module 110. The battery management apparatus 120 may manage charging and/or discharging of the battery module 110.

In addition, the battery management apparatus 120 may monitor a voltage, a current, a temperature, etc., of the battery module 110 and/or each of the plurality of battery cells 111, 112, 113, and 114 included in the battery module 110. A sensor or various measurement modules for monitoring performed by the battery management apparatus 120, which are not shown, may be additionally installed in the battery module 110, a charging/discharging path, any position of the battery module 110, etc. The battery management apparatus 120 may calculate a parameter indicating a state of the battery module 110, e.g., a state of charge (SOC), a state of health (SOH) etc., based on a measurement value such as monitored voltage, current, temperature, etc.

The battery management apparatus 120 may control an operation of the relay 140. For example, the battery management apparatus 120 may short-circuit the relay 140 to supply power to the target device. The battery management apparatus 120 may short-circuit the relay 140 when a charging device is connected to the battery pack 100.

The battery management apparatus 120 may calculate a cell balancing time of each of the plurality of battery cells 111, 112, 113, and 114. Herein, the cell balancing time may be defined as a time required for balancing of the battery cell. For example, the battery management apparatus 120 may calculate a cell balancing time based on an SOC, a battery capacity, and a balancing efficiency of each of the plurality of battery cells 111, 112, 113, and 114.

The battery authentication module 130 may verify the stability of an external device that requests battery data and transmit the battery data to the external device. According to an embodiment, the battery authentication module 130 may be electrically connected to the battery management apparatus 120 or may be mounted inside the battery management apparatus 120 to obtain the battery data from the battery management apparatus 120.

Figure 2:
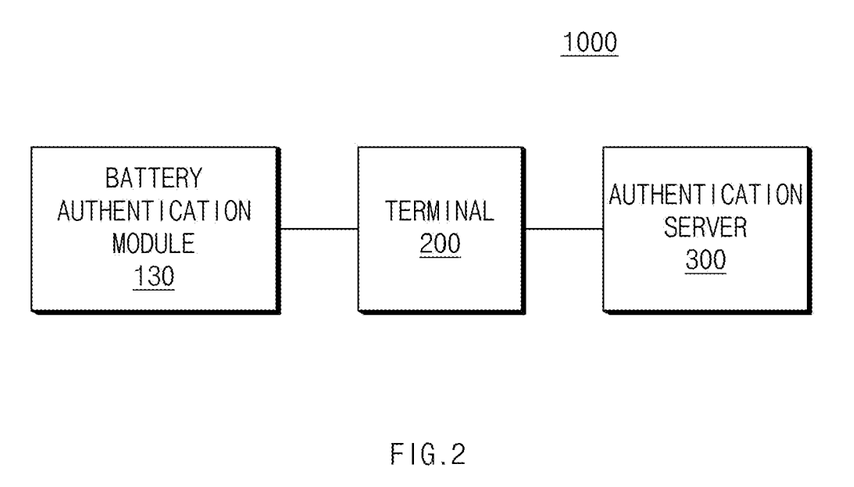
FIG. 2 is a block diagram illustrating a configuration of a battery data management system, according to an embodiment disclosed herein.

Hereinbelow, a configuration of a battery data management system 1000 including the battery authentication module 130 described above will be described in detail with reference to FIG. 2. In FIG. 2, the battery module 110 may include the plurality of battery cells 111, 112, 113, and 114, but the first battery cell 111 will be described as an example below.

FIG. 2 is a block diagram illustrating a configuration of a battery data management system, according to an embodiment disclosed herein. Referring to FIG. 2, the battery management apparatus 1000 may include a battery authentication module 130, a terminal 200, and an authentication server 300.

The battery authentication module 130 may receive and transmit an encrypted message from and to the terminal 200 to verify the stability of the terminal 200. Typical data communication applies encryption to guarantee confidentiality for a sensitive message. When a message received in a data communication process is not verified without separate encryption/decryption, an external intrusion message forged on a network may be allowed, resulting a fatal threat to a user.

The terminal 200 may communicate with the battery authentication module 130 to obtain battery data of the first battery cell 111. For example, the terminal 200 may request the battery data of the first battery cell 111 to the battery authentication module 130 and perform a mutual stability verification process with the battery authentication module 130 to obtain encrypted battery data of the first battery cell 111. According to an embodiment, the terminal 200 may be implemented in the form of a portable terminal or a stationary terminal.

The authentication server 300 may support the mutual stability verification process of the terminal 200 and the battery authentication module 130. The authentication server 300 may verify a message received by the terminal 200 from the battery authentication module 130 to verify the stability of the battery authentication module 130. The authentication server 300 may generate a message required for the terminal 200 to be verified in terms of stability thereof by the battery authentication module 130 and transmit the message to the terminal 200.

Hereinbelow, a configuration of each of the battery authentication module 130, the terminal 200, and the authentication server 300 will be described with reference to FIGS. 3 to 5.

Figure 3:
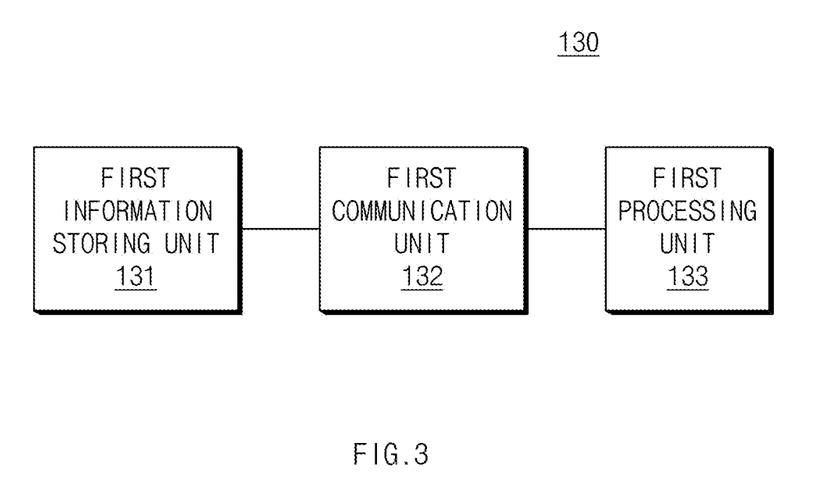
FIG. 3 is a block diagram illustrating a configuration of a battery authentication module according to an embodiment disclosed herein.

FIG. 3 is a block diagram illustrating a configuration of the battery authentication module 130 according to an embodiment disclosed herein. Referring to FIG. 3, the battery authentication module 130 according to an embodiment may include a first information storing unit 131, a first communication unit 132, and a first processing unit 133.

The first information storing unit 131 may store battery-related information of a first battery cell. The first information storing unit 131 may store authentication information required to generate a message corresponding to the message received from the terminal 200. For example, the authentication information may include at least any one of serial information of the first battery cell 111, serial information of the battery module 110, an address of the authentication server 300, or a random number generation algorithm.

The first communication unit 132 may receive the encrypted message from the terminal 200 and transmit the encrypted message to the terminal 200. More specifically, the first communication unit 132 may transmit an encrypted second message or an encrypted second key to the terminal 200.

The first communication unit 132 may transmit encrypted battery data to the terminal 200 over a wired/wireless network. For example, the first communication unit 132 may transmit the encrypted battery data to the terminal 200 through Bluetooth, Wi-Fi, ZigBee.

The first processing unit 133 may generate a message corresponding to the message received from the terminal 200 to verify the stability of the terminal 200. More specifically, the first processing unit 133 may decrypt a first message encrypted using a previously stored first key to obtain the first message. The first processing unit 133 may generate a message corresponding to the first message and verify the stability of the terminal 200 by determining whether the first message and the message corresponding to the first message are the same as each other. The first processing unit 133 may generate a second message when the first message and the message corresponding to the first message are the same as each other. The first processing unit 133 may generate an encrypted second message by encrypting the second message with a first key.

In addition, the first processing unit 133 may decrypt a third message encrypted with the first key obtain the third message. The first processing unit 133 may generate a message corresponding to the third message and verify the third message by determining whether the third message and the message corresponding to the third message are the same as each other.

The first processing unit 133 may encrypt the battery data obtained from the battery management apparatus 120 and transmit the encrypted battery data to the terminal 200. Herein, the battery data may include, for example, voltage, current, temperature, a state of charge (SOC), etc., of the first battery cell 111. For example, the first processing unit 133 may generate a second key that is a shared session key to encrypt the battery data with the second key.

Figure 4:
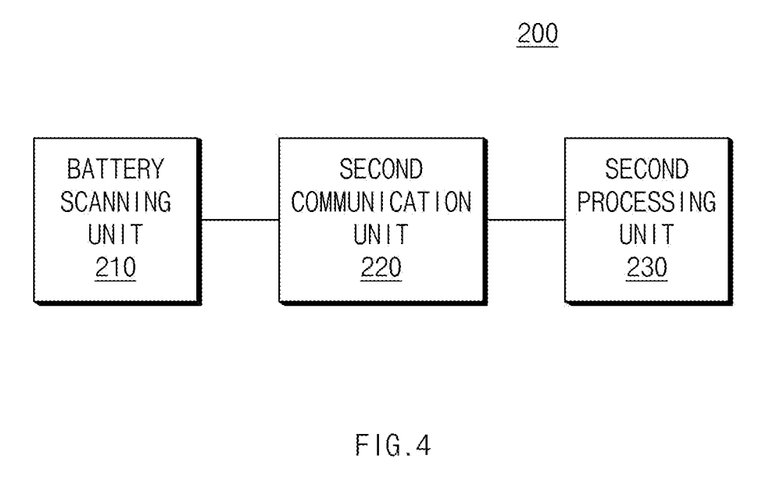
FIG. 4 is a block diagram illustrating a configuration of a terminal according to an embodiment disclosed herein.

FIG. 4 is a block diagram illustrating a configuration of the terminal 200 according to an embodiment disclosed herein. Referring to FIG. 4, the terminal 200 may include a battery scanning unit 210, a second communication unit 220, and a second processing unit 230.

The battery scanning unit 210 may obtain battery-related information of the first battery cell 111 by scanning the first battery cell 111. The battery scanning unit 210 may directly receive the battery-related information of the first battery cell 111 from the user and store information.

Herein, the battery-related information, which is information including data related to the battery, may be disclosed externally and thus obtained by the terminal 200 without a separate verification process. For example, the battery-related information may include information of a vehicle having the battery mounted thereon or a vehicle information number of the vehicle.

The second communication unit 220 may transmit the encrypted first message to the battery authentication module 130. The second communication unit 220 may transmit the first message and the second message to the authentication server 300. The second communication unit 220 may transmit the encrypted third message to the battery authentication module 130.

The second processing unit 230 may generate or decrypt the encrypted message. More specifically, the second processing unit 230 may encrypt the first message or the third message by using a public key. In addition, the second processing unit 230 may decrypt the second message using the public key to obtain the second message.

Figure 5:
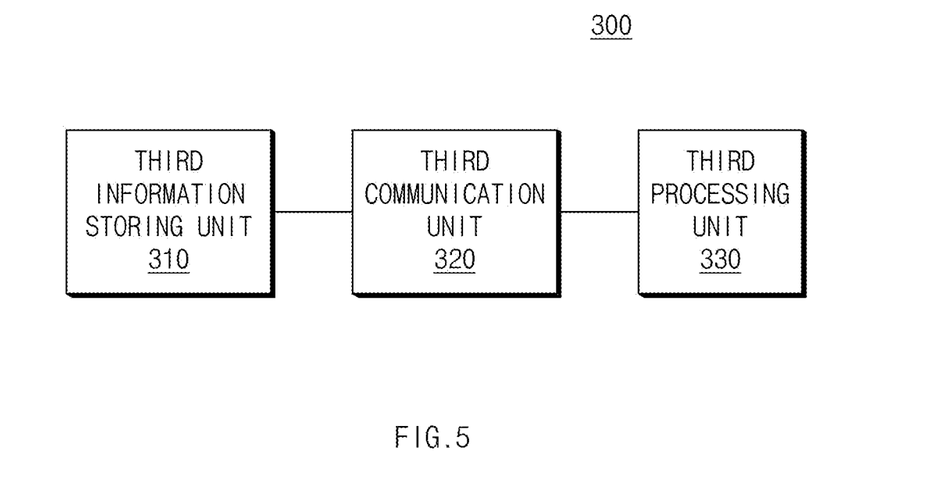
FIG. 5 is a block diagram illustrating a configuration of an authentication server according to an embodiment disclosed herein.

FIG. 5 is a block diagram illustrating a configuration of an authentication server according to an embodiment disclosed herein. Referring to FIG. 5, the authentication server 300 may include a third information storing unit 310, a third communication unit 320, and a third processing unit 330.

The third information storing unit 310 may store battery-related information of the first battery cell. The third information storing unit 310 may store authentication information required to generate a message corresponding to the message received from the terminal 200. For example, the authentication information may include at least any one of serial information of the first battery cell 111, serial information of the battery module 110, an address of the authentication server 300, or a random number generation algorithm.

The third communication unit 320 may transmit the public key and the first message to the terminal 200. The third communication unit 320 may also transmit the message corresponding to the second message to the terminal 200.

The third processing unit 330 may generate a message corresponding to the message generated by the battery authentication module 130 to verify the stability of the battery authentication module 130. For example, the third processing unit 330 may generate the message corresponding to the second message. The third processing unit 330 may determine whether the second message and the message corresponding thereto are the same as each other to verify the stability of the battery authentication module 130. The third processing unit 330 may generate the third message when the second message and the message corresponding to the second message are the same as each other.

As described above, the battery data management system 1000 according to an embodiment disclosed herein may directly obtain data of the battery through a wired/wireless network and create a security-enhanced battery data communication environment.

Embodiments disclosed herein aim to directly obtain data of a battery through a wired/wireless network and provide a battery data management system and an operating method thereof.

In addition, the battery data management system 1000 may detect an external intruder trying infiltration using a forged message by performing communication for decrypting an encrypted message.

The battery data management system 1000 may transmit data of a battery cell outside in real time to allow a battery data manager or a battery producer to immediately determine whether the battery cell is defective.

The battery data management system 1000 may obtain and transmit battery data to improve the efficiency of battery data management, without conveying the battery pack 100 with separate equipment after manufacturing of the battery pack 100 or attaching/removing the battery pack 100 to/from the vehicle.

Figure 6:
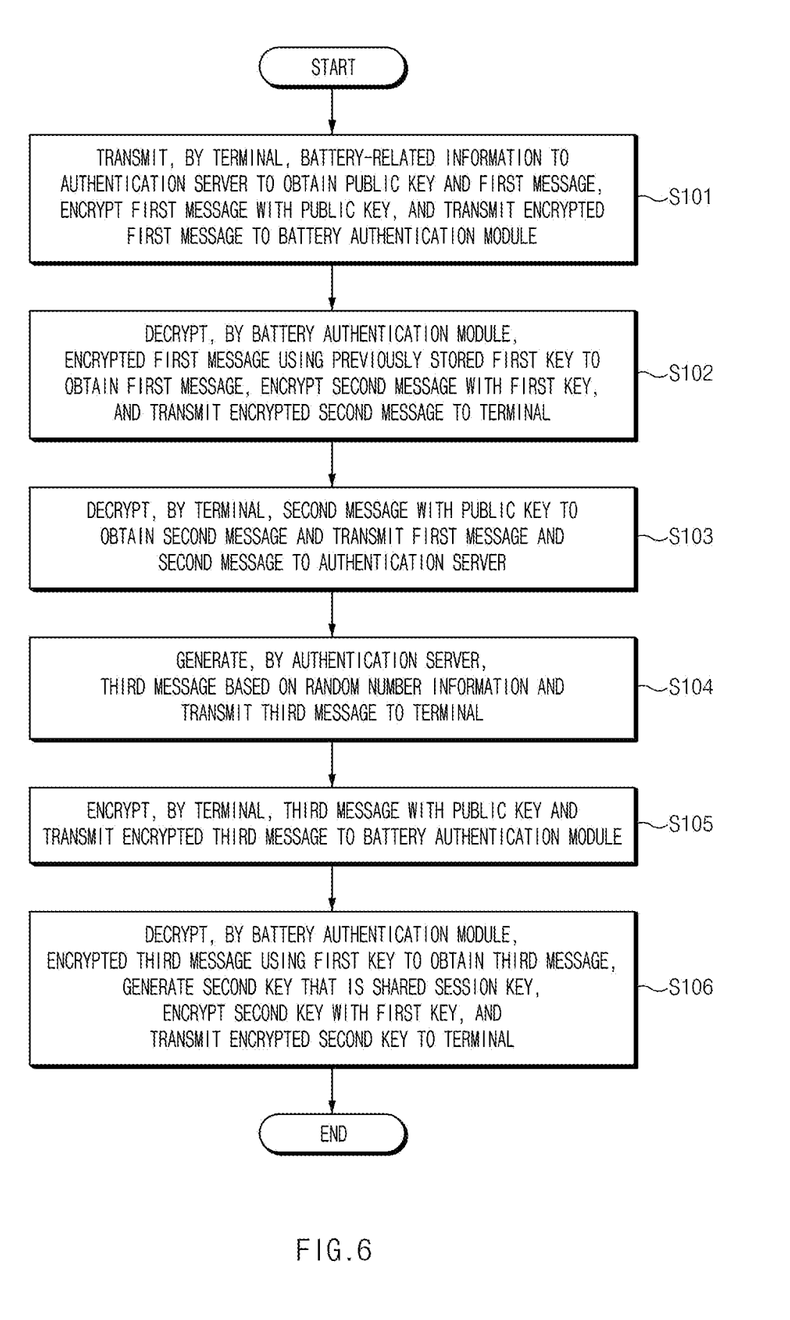
FIG. 6 is a flowchart illustrating an operating method of a battery data management system according to an embodiment disclosed herein.

FIG. 6 is a flowchart illustrating an operating method of a battery data management system according to an embodiment disclosed herein.

Hereinbelow, referring to FIG. 6, an operating method of the battery data management system will be described in detail.

Referring to FIG. 6, an operating method of a battery data management system according to an embodiment disclosed herein may include operation S101 of transmitting, by the terminal 200, battery-related information to the authentication server 300 to obtain a public key and a first message, encrypting a first message with the public key, and transmitting the encrypted first message to the battery authentication module 130, operation S102 of decrypting, by the battery authentication module 130, the encrypted first message using a previously stored first key to obtain the first message, generating a second message based on random number information, encrypting the second message with the first key, and transmitting the encrypted second message to the terminal 200, operation S103 of decrypting, by the terminal 200, the second message with the public key to obtain the second message and transmitting the first message and the second message to the authentication server 300, operation S104 of generating, by the authentication server 300, a third message based on the random number and transmitting the third message to the terminal 200, operation S105 of encrypting, by the terminal 200, the third message with the public key and transmitting the encrypted third message to the battery authentication module 130, and operation S106 of decrypting, by the battery authentication module 130, the encrypted third message using the first key to obtain the third message, generating a second key that is a shared session key, encrypting the second key with the first key, and transmitting the encrypted second key to the terminal 200.

Referring to FIG. 6, in operation S101, the terminal 200 may scan a battery to obtain battery-related information. For example, the terminal 200 may directly receive the battery-related information from the user and store the battery-related information.

In operation S101, the terminal 200 may transmit the obtained battery-related information to the authentication server 300. In operation S101, the authentication server 300 may transmit the public key and the first message to the terminal 200.

In operation S101, the terminal 200 may encrypt the first message with the public key and transmit the encrypted first message to the battery authentication module 130.

In operation S102, the battery authentication module 130 may decrypt the first message encrypted using the previously stored first key to obtain the first message.

In operation S102, the battery authentication module 130 may generate the second message.

In operation S102, the battery authentication module 130 may encrypt the second message with the first key and transmit the encrypted second message to the terminal 200.

In operation S103, the terminal 200 may decrypt the second message using the public key to obtain the second message. In operation S103, the terminal 200 may transmit the first message and the second message to the authentication server 300.

In operation S104, the authentication server 300 may generate the third message and transmit the third message to the terminal 200.

In operation S105, the terminal 200 may encrypt the third message with the public key received from the authentication server 300 and transmit the encrypted third message to the battery authentication module 130.

In operation S106, the battery authentication module 130 may decrypt the third message encrypted using the first key to obtain the third message.

In operation S106, the battery authentication module 130 may generate the second key that is a shared session key. Herein, the second key may be a shared key that may be used in encryption and decryption of the battery data or the message by the terminal 200 and the battery authentication module 130 for data communication.

In operation S106, the battery authentication module 130 may encrypt the second key with the first key and transmit the encrypted second key to the terminal 200.

Figure 7A:
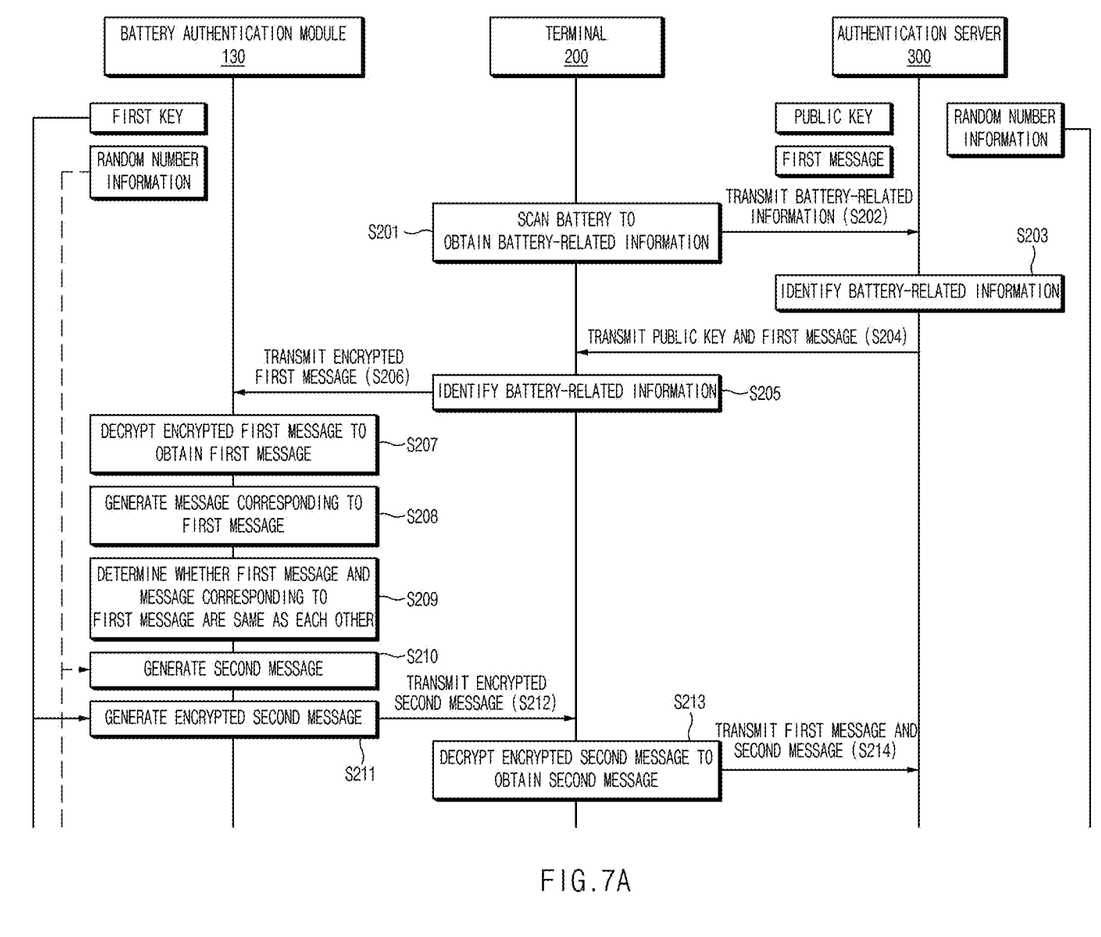
FIGS. 7A and 7B are views for generally describing a battery data management system according to an embodiment disclosed herein.
Figure 7B:
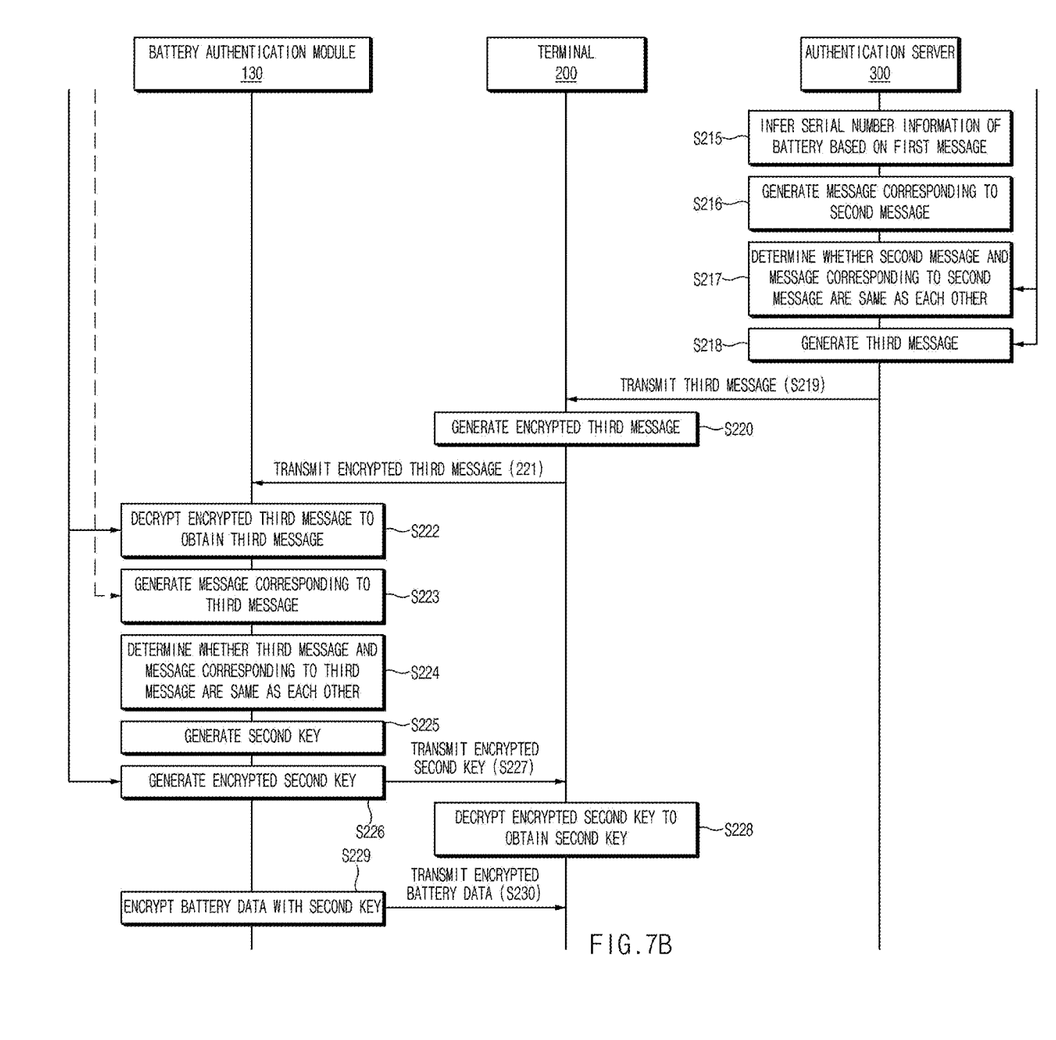

FIGS. 7A and 7B are views for generally describing a battery data management system according to an embodiment disclosed herein.

Hereinbelow, with reference to FIGS. 7A and 7B, a mutual stability verification process of the battery authentication module 130, the terminal 200, and the authentication server 300 of the battery data management system 1000 will be described in detail. FIG. 7B shows operations following a series of operations S201 to S214 of the battery data management system 1000 shown in FIG. 7A.

Referring to FIG. 7A, in operation S201, the terminal 200 may scan the battery to obtain the battery-related information.

In operation S202, the terminal 200 may transmit the obtained battery-related information to the authentication server 300.

In operation S203, the authentication server 300 may identify the battery-related information received from the terminal 200 to determine suitability of the battery-related information.

In operation S204, the authentication server 300 may transmit the public key and the first message to the terminal 200.

In operation S205, the terminal 200 may encrypt the first message with the public key.

In operation S206, the terminal 200 may transmit the encrypted first message to the battery authentication module 130.

In operation S207, the battery authentication module 130 may decrypt the first message encrypted using the previously stored first key to obtain the first message.

In operation S208, the battery authentication module 130 may generate the message corresponding to the first message. For example, in operation S208, the battery authentication module 130 may generate the message corresponding to the first message by using at least any one of previously stored serial information of the first battery cell 111, serial information of the battery module 110, an address of the authentication server 300, or a random number generation algorithm.

In operation S209, the battery authentication module 130 may verification verify the stability of the terminal 200 by determining whether the first message and the message corresponding to the first message are the same as each other.

In operation S210, the battery authentication module 130 may generate the second message based on the random number information when the first message and the message corresponding to the first message are the same as each other. For example, in operation S210, the battery authentication module 130 may generate the second message by using One Time Password (OTP) information.

In operation S211, the battery authentication module 130 may encrypt the second message with the first key to generate the encrypted second message.

In operation S212, the battery authentication module 130 may transmit the encrypted second message to the terminal 200.

In operation S213, the terminal 200 may decrypt the second message using the public key to obtain the second message. For example, in operation S213, the terminal 200 may identify base information of the second message such as the number of digits or a data length of the second message to determine suitability of the second message.

In operation S214, when the second message is suitable, the terminal 200 may transmit the first message and the second message to the authentication server 300.

Referring to FIG. 7B, in operation S215, the authentication server 300 may infer the serial number information of the battery based on the received first message and determine whether the inferred battery serial number information is suitable.

In operation S216, the authentication server 300 may generate the message corresponding to the second message based on the random number information when the inferred battery serial number information is suitable. For example, in operation S216, the authentication server 300 may generate the message corresponding to the second message by using at least any one of the previously stored serial information of the first battery cell 111, the serial information of the battery module 110, the address of the authentication server 300, or the random number generation algorithm.

In operation S217, the authentication server 300 may determine whether the second message and the message corresponding thereto are the same as each other to verify the stability of the battery authentication module 130.

In operation S218, the authentication server 300 may generate the third message based on the random number information when the second message and the message corresponding to the second message are the same as each other. For example, in operation S218, the authentication server 300 may generate the third message by using the OTP information.

In operation S219, the authentication server 300 may transmit the message corresponding to the second message to the terminal 200.

In operation S220, the terminal 200 may encrypt the third message with the public key received from the authentication server 300.

In operation S221, the terminal 200 may transmit the encrypted third message to the battery authentication module 130.

In operation S222, the battery authentication module 130 may decrypt the third message encrypted using the first key to obtain the third message.

In operation S223, the battery authentication module 130 may generate the message corresponding to the third message based on the random number information.

In operation S224, the battery authentication module 130 may verify the third message by determining whether the third message and the message corresponding to the third message are the same as each other.

In operation S225, the battery authentication module 130 may generate the second key that is a shared session key when the third message and the message corresponding to the third message are the same as each other.

In operation S226, the battery authentication module 130 may encrypt the second key with the first key to generate the encrypted second key.

In operation S227, the battery authentication module 130 may transmit the encrypted second key to the terminal 200.

In operation S228, the terminal 200 may decrypt the encrypted second message using the public key to obtain the second message.

In operation S229, the battery authentication module 130 may encrypt the battery data with the second key.

In operation S230, the battery authentication module 130 may transmit the encrypted battery data to the terminal 200.

The above description is merely illustrative of the technical idea of the present disclosure, and various modifications and variations will be possible without departing from the essential characteristics of the present disclosure by those of ordinary skill in the art to which the present disclosure pertains.

Therefore, the embodiments disclosed in the present invention are intended for description rather than limitation of the technical spirit of the present disclosure and the scope of the technical spirit of the present invention is not limited by these embodiments. The protection scope of the present invention should be interpreted by the following claims, and all technical spirits within the same range should be understood to be included in the range of the present invention.

The invention claimed is:

1. A battery data management method, the method comprising:
    transmitting, by a terminal, battery-related information of a battery to an authentication server to obtain a public key and a first message;
    encrypting by the terminal, the first message with the public key;
    transmitting by the terminal the encrypted first message to a processor;
    decrypting, by the processor the encrypted first message using a previously stored first key to obtain the first message;
    generating, by the processor, a second message based on random number information;
    encrypting, by the processor, the second message with the first key;
    transmitting, by the processor the encrypted second message to the terminal;
    decrypting, by the terminal, the second message with the public key to obtain the second message; and
    transmitting, by the terminal, the first message and the second message to the authentication server
    generating, by an authentication server, a third message based on the random number information;
    transmitting, by the authentication server, the third message to the terminal;
    encrypting, by the terminal, the third message with the public key;
    transmitting, by the terminal, the encrypted third message to the processor;
    decrypting, by the processor, the encrypted third message using the first key to obtain the third message;
    generating, by the processor, a second key that is a shared session key;
    encrypting, by the processor, the second key with the first key; and
    transmitting, by the processor, the encrypted second key to the terminal.

2. The operating method of claim 1, further comprising decrypting, by the terminal, the encrypted second key using the public key to obtain the second key.

3. The method of claim 2, further comprising:
    encrypting, by the processor battery related information with the second key; and
    transmitting, by the processor, the encrypted battery data to the terminal.

4. The method of claim 1, further comprising:
    generating, by the processor, a message corresponding to the first message; and
    verifying stability of the terminal by determining whether the first message and the message corresponding to the first message are the same as each other.

5. The method of claim 1, wherein generating the second message based on the random number information is performed using OTP information.

6. The method of claim 1, further comprising:
    inferring serial number information of the battery based on the first message; and
    determining whether the inferred serial number information of the battery is suitable.

7. The method of claim 6, further comprising:
    generating a message corresponding to the second message based on the random number information; and
    determining whether the second message and the message corresponding to the second message are the same as each other.

8. The method of claim 1, wherein generating, by the authentication server, the third message based on the random number information is performed using the OTP information.

9. The method of claim 1, further comprising:
    generating a message corresponding to the third message based on the random number information; and
    verifying the third message by determining whether the third message and the message corresponding to the third message are the same as each other.

10. The method of claim 1, further comprising obtaining, by the terminal, the battery-related information by scanning the battery.

11. The method of claim 1, wherein the battery-related information comprises information of a vehicle having the battery mounted thereon.

12. A battery data management system comprising:
    a terminal configured to:
        obtain a public key and a first message based on battery-related information;
        encrypt the first message with the public key; and
        request transmission of battery data based on the encrypted first message;
    a processor configured to:
        decrypt the encrypted first message using a previously stored first key to obtain the first message;
        generate a second message based on random number information;
        encrypt the second message with the first key; and transmit the encrypted second message to the terminal to verify stability of the terminal; and an authentication server configured to:
   generate a third message based on the random number information; and
   transmit the third message to the terminal to verify stability of the processor.

13. The battery data management system of claim 12, wherein the terminal is further configured to:
   receive the encrypted second message from the processor;
   decrypt the second message with the public key to obtain the second message; and
   transmit the first message and the second message to the authentication server.

14. The battery data management system of claim 13, wherein the terminal is further configured to:
   receive the third message from the authentication server;
   encrypt the third message with the public key; and
   transmit the encrypted third message to the processor.

15. The battery data management system of claim 14, wherein the processor is further configured to:
   decrypt the encrypted third message using the first key to obtain the third message;
   generate a second key that is a shared session key;
   encrypt the second key with the first key; and
   transmit the encrypted second key to the terminal.

16. The battery data management system of claim 15, wherein the terminal is further configured to:
   decrypt the encrypted second key using the public key to obtain the second key, and wherein the terminal and the processor are further configured to encrypt and decrypt the battery data with the second key to perform data communication.

* * * * *